US007970655B2

(12) United States Patent
Schwab

(10) Patent No.: US 7,970,655 B2
(45) Date of Patent: Jun. 28, 2011

(54) SECURE INTERACTIVE DIGITAL SYSTEM FOR DISPLAYING ITEMS TO A USER IDENTIFIED AS HAVING PERMISSION TO ACCESS THE SYSTEM

(76) Inventor: Barry Schwab, West Bloomfield, MI (US)

( * ) Notice: Subject to any disclaimer, the term of this patent is extended or adjusted under 35 U.S.C. 154(b) by 972 days.

(21) Appl. No.: 11/493,884

(22) Filed: Jul. 26, 2006

(65) Prior Publication Data

US 2008/0059331 A1 Mar. 6, 2008

Related U.S. Application Data

(63) Continuation of application No. 09/846,933, filed on May 1, 2001, now abandoned, which is a continuation-in-part of application No. 08/205,885, filed on Mar. 3, 1994, now abandoned, and a continuation-in-part of application No. 08/393,493, filed on Feb. 24, 1995, now Pat. No. 6,353,699, and a continuation-in-part of application No. 08/410,318, filed on Mar. 24, 1995, now abandoned, and a continuation-in-part of application No. 08/453,393, filed on May 30, 1995, now Pat. No. 5,973,731, and a continuation-in-part of application No. 09/020,456, filed on Feb. 9, 1998, now Pat. No. 6,226,412, and a continuation-in-part of application No. 09/687,131, filed on Oct. 13, 2000, now abandoned.

(51) Int. Cl.
*G06Q 30/00* (2006.01)
(52) U.S. Cl. ............. 705/26.1; 705/14; 705/26; 705/27; 713/162; 713/182; 713/186; 348/161
(58) Field of Classification Search ............... 705/14, 705/26, 27, 26.1; 713/186, 182, 162; 348/161
See application file for complete search history.

(56) References Cited

U.S. PATENT DOCUMENTS 5,321,751 A * 6/1994 Ray et al. ............. 713/186

* cited by examiner

*Primary Examiner* — Yogesh C Garg
(74) *Attorney, Agent, or Firm* — Gifford, Krass, Sprinkle, Anderson & Citkowski, P.C.

(57) ABSTRACT

Methods and apparatus are described which provide secure interactive communication of text and image information between a central server computer and one or more client computers located at remote sites for the purpose of storing and retrieving files describing and identifying unique products, services, or individuals. A feature of the system is the ability to associate an identification image with a plurality of accounts, transactions, or records and identify a user not physically present at the client computer. Textual information and image data from one or more of the remote sites are stored separately at the location of the central server computer, requests for information are entered from remote terminals, the system being able to respond to multiple user requests simultaneously, and the information requested is recalled and downloaded for review to be displayed at the remote site.

6 Claims, 7 Drawing Sheets

Figure 6

HomeScan

Features
- Ref. #: ACF2573J
- MLS #: 1256825
- Rooms: 9
- Bedrooms: 5
- Baths: 3.5
- Sq. Ft.: 2650
- Location: Miami Beach
- Price: 345,000

Comments

| Room | Size    | Comments            |
|------|---------|---------------------|
| BR1  | 11 x 20 | Two walk-in closets |
| BR2  | 11 x 14 | Southern exposure   |
| BR3  | 11 x 13 |                     |
| BR4  | 11 x 11 | Perfect for nursery |

Special Features

Beautifully landscaped lot backing onto boat access area. Magnificent Master Bedroom suite with two walk-in closets. Light fixtures imported from and two-person Jacuzzi. Huge redwood deck suitable Czechoslovakia, all included.

Figure 7

Physical Description

Ref. # AJ4H639L

Date of Birth 04/11/1987

Disappeared 03/30/1992

Race Hispanic

Hair Black

Eyes Brown

Height 4'1"

Weight 78

Distinguishing Features: Wears Glasses. Birthmark on upper right arm; burn scar on left elbow

KidScan

Background

Disappeared from backyard on March 30, 1992. Believed to be parental abduction; parents divorced in June, 1989. No history of child abuse.

SECURE INTERACTIVE DIGITAL SYSTEM FOR DISPLAYING ITEMS TO A USER IDENTIFIED AS HAVING PERMISSION TO ACCESS THE SYSTEM

CROSS-REFERENCE TO RELATED APPLICATIONS

This is a continuation of application Ser. No. 09/846,933 which was filed on May 1, 2001 now abandoned which was a continuation-in-part of application Ser. No. 08/205,885, filed Mar. 3, 1994; now abandoned; Ser. No. 08/393,493, filed Feb. 24, 1995 now U.S. Pat. No. 6,353,699; Ser. No. 08/410,318, filed Mar. 24, 1995; now abandoned; Ser. No. 08/453,393, filed May 30, 1995, issuing Oct. 26, 1999 as U.S. Pat. No. 5,973,731; Ser. No. 09/020,456, filed Feb. 9, 1998, and Ser. No. 09/687,131, filed Oct. 13, 2000 now abandoned, the disclosures of which are hereby specifically incorporated herein by reference.

FIELD OF THE INVENTION

The present invention relates generally to interactive secure identification transaction systems for storing, retrieving, and displaying text and data compressed image files and communicating same between a centralized server computer and a plurality of client data terminals located at remote sites, for the purposes of displaying items to a requestor, possibly not physically located at the remote terminal, only after verifying that the requestor is authorized to view the items.

BACKGROUND OF THE INVENTION

Various systems have been proposed for accessing text image information associated with catalog type sales, wherein each listed item is advertised in the terms of desired quantities, qualities, and so forth. Updates to such systems are done on an occasional or seasonal basis, as new products are added or older products are removed. While some searching of the database may be possible, it generally is limited to the different styles, colors, etc. of products manufactured in large quantities.

Systems also exist which support the sale of unique products or items, such as trucks having particular equipment, or persons having particular characteristics. One example of a system of this type is disclosed in Bijnagte (U.S. Pat. No. 5,235,680), wherein the product is real estate. The system architecture of Bijnagte is limited to that of the host-terminal, however, and all transactions, including picture scanning, are performed on an on-line, interactive basis. Images are limited to 8-bit color and a maximum of sixteen in number, and are further limited in size to dimensions in pixels of 128.times.100 (approximately ¼ screen at relatively low resolution), and data compression is limited to approximately 2:1, which is characteristic of "loss-free" compression in which there is no actual reduction in the amount of data. In addition, only limited means are included to prevent unauthorized access or modification of records.

Another related information system is disclosed by Sibley, Jr. (U.S. Pat. No. 4,677,552), in which commodity market bids are conveyed between remote terminal sites by way of local trade exchanges and satellite communication links. By their very nature, such products are not unique, and would not benefit from the use of image information.

Many identification systems are described in the art, and the methodologies of these approaches cover a wide range of techniques. In some cases, a photograph of a subject or his fingerprint pattern is affixed to an identification card, usually as part of a tamper-resistant assembly. In other approaches, various methods are employed for storing image or password information in a magnetic stripe or in an optically encoded image or pattern that is physically part of the identification card. Still other approaches utilize a "smart card" having its own semiconductor memory and/or microprocessor capability for information storage. Each of these techniques is effective for specific applications, but in each case the security carries a high cost, either in expense for the materials involved, the complexity of the assembly process for the identification card, or the repetitive cost of applying the method to a plurality of individual identification cards utilized for different circumstances. In addition, since a major part of the identification information is carried in the physical identification card itself, it is subject to tampering, alteration, or replication if it falls under the control of an unauthorized user.

Accordingly, there is always a need for improvements in secure identification systems, such as where a seller can communicate unique and or other proprietary business information only to buyers who are confirmed as being authorized to view the information. Preferably, the system is interactive and the user may be identified even if not physically present at the seller's transaction terminal.

An object of this invention is provision of a secure method and apparatus for transacting business between one or more buyers, simultaneously, at respective transaction terminals remote to and in communication with the seller's central server computer.

Advantageously, such a system would enable products and services to be made available to requesters, such as in a "home-shopping" environment, or subscribers, such as consumers who pay for access to seller information, or bidders, such as in on-line buying-selling transactions. In addition, the system would provide for the control and management of data records and images representing items for sale or for reference use, including the ability to update or modify records already entered, using special computer software to provide controlled access to these data records.

SUMMARY OF THE INVENTION

The present invention provides a method of storing and retrieving information relating to unique products, services and/or individuals. The invention utilizes a client/server architecture applied to a central relational database, using advanced image data compression to provide realistic image rendition and rapid communication response time. In addition, image capture is performed on a non-interactive basis insofar as the central database server, so as to minimize server participation and communication costs.

All text and image data is processed within respective remote client computers, permitting the central relational database to be rapidly updated in a single series of transactions. In one aspect, batch uploading is used. The remote computer may maintain its own local database, however, so that images and text may be uploaded to the central computer on a selective basis, and added to the central relational database or included in listings published in videocassettes, optical or magneto-optical discs of any format, or other popular consumer distribution formats, in accordance with U.S. Pat. No. 5,973,731 and pending patent application Ser. No. 08/393,493, the specifications of which are hereby incorporated herein by reference. Images may be stored as individual files or as "pages" within an image compilation file. All records and communications are protected by security measures such as log-on verification, "Caller ID", or data encryption (whether hardware based or software based), so as to restrict access or modification of records to the "owners" of the individual records.

The system may make advantageous use of different image data compression formats for the various users and sources. In one embodiment, a first format may be used for the locally stored images, a second format may be used for images transmitted from a remote site to the central computer database, and a third format may be used for images transmitted from the central computer database to a remote site. As such, locally stored images could not be transmitted or transferred by magnetic disc or other media to any other remote site unless routed through the central computer, at which time the images are reformatted and retransmitted.

An additional feature is the inclusion of provisions for electronic messaging, with or without association to particular files. For example, a customer could register a bid on a listed product, or a customer searching for a particular product not listed in the database could leave a message so that another customer considering the possibility of a sale might respond to that request. Furthermore, such bidding may be carried out on a live or an interactive basis, facilitating an on-line auction. Alternatively, electronic messaging may be directed towards individuals listed in the database, or those customers who might wish to contact other customers on a confidential basis.

A further feature is the inclusion of provisions to implement a hardware security key (commonly referred to as a "dongle") in which security information is included. Such security information may include passwords, database connection information, control of available program features specific to a particular client, or other suitable information.

Although in one embodiment the system uses a single, central computer site in conjunction with a plurality of remote computer sites, it may be advantageous to organize the central computer system as a network of regional computers, each servicing a subset area of a particular remote computer site. These regional computers would be connected through dedicated communication links, to reduce local telephone call costs and for redundancy in case of natural disasters or accidents.

Further, the present invention overcomes the limitations of the identification systems of the prior art by utilizing a separate, centralized database to store data-compressed images of the subject individuals or items, and subsequently downloading the data-compressed images to local data terminals, on demand, at the time of the identification event or transaction. Because the image information is not stored within a user's identification card itself, it is not subject to alteration or replication by an unauthorized user, and the use of encryption techniques makes the image information useless if the data signals are intercepted. In addition, a plurality of identification cards or customer accounts may be associated with a single image, as, for example, all of the credit cards owned by a single individual, or the separate checking and savings accounts for an individual. In the case of a credit card, images for both a husband and a wife could be associated with an individual card or a plurality of cards; similarly, an image for a child having authorization to use a card could be associated with that card, and, if desired, could be assigned a different credit limit. The images may include a copy of the authorized signature, or the signature may be provided as a separate image file, which then could be used by the transaction terminal to compare to a scanned image of the signature on the authorization slip or the input of a "pen" computer or pressure-sensitive pad. Additional information, such as the Social Security Number or the mother's maiden name for the cardholder may be used to augment these security measures.

In cases in which a user is to be identified although he or she is not physically present at the transaction terminal, as, for example, when products are ordered by telephone using a credit card, the terminal operator would be able to accomplish a partial identification by using the image to compare the physical appearance in the image to the details supplied by the customer in response to operator questions. Alternatively, the customer could choose a distinctive image (serving as a "token"), such as a corporate logo or a picture of an animal or an item having special significance as his confirmation symbol, and the operator would expect the customer to validate his order by describing his confirmation symbol. As a further verification, the customer could be required to key in a personal identification number ("PIN") using his telephone keypad, which then could be compared to the number stored in the central database for each credit card; in an alternative embodiment, this PIN number could serve as the decryption key for the image file presented to the operator. In the future, when videophones and the like become available generally, it will be possible to perform this identification process visually; in addition, the use of "pen" computer units would allow a customer to transmit his authorization signature directly to the transaction terminal. Many alternative methods of conveying unique identification information, such as security keys, special identification card scanners, etc. are well known in the art.

As image recognition systems become more reliable, many of these visual identification steps may be automated. In this case, it will be desirable to provide video camera facilities at the transaction terminals, so that the image of the purchaser may be captured at the time of the transaction. If desired, such an image could be uploaded to the transaction computer to provide a record of the identity of the purchaser in a particular transaction. Other images, such as (but not limited to) physical characteristics, fingerprints, signatures, "tokens", and so on, also may serve to memorialize the transaction and/or the identities of the participants.

In actual implementation, the image information may be relayed to the transaction terminal through a central transaction computer, such as those utilized by current credit card clearing houses. As an alternative, the image database computer could serve as the gateway to the central transaction computer, by relaying the financial information to the central transaction computer. In this case, it would be somewhat less complicated to maintain a record of the image of the purchaser, as this image database computer would be optimized for image handling and storage.

At the remote transaction terminal location, it would be advantageous to integrate the video display capabilities into a single unit which also provided the data-input and cash-register facilities. Where this is not feasible, an analogous data-communications path would be utilized, with a separate video display unit situated at the transaction terminal location.

In some applications, it may be desirable to provide a local image database, as, for example, of regular customers at a particular retail store. Although this reduces the level of security available, it would speed communications and decrease the on-line time for the centralized computer database. In addition, it would allow verification of the identity of the customer, without the need to communicate with the central database computer. Furthermore, a local database may provide additional data management capabilities, even if not all of the information related to the item resides within the local database: for example, the local database may store an encrypted image, while the decryption key is provided from the central database.

When implemented in a typical sales operation, image records representing the individual products optionally may be stored in a local database, such that as a product price tag is scanned at the check-out register, an image of the product is relayed from the database computer to the check-out register transaction terminal so that the identification of the product may be verified by visual comparison with the image displayed on the transaction terminal, thereby confirming the accuracy of the scan and preventing a customer from placing the price tag of a less expensive product on a more expensive product that the customer wishes to purchase.

In a banking environment, an image of the customer at an ATM terminal could be compared to a downloaded image to verify the identity of the customer. Several systems for automatic image recognition are presently available, with recognition rates varying from 95% to over 99%, depending on the strictness of the comparison. For in-person banking transactions, images of the subject person may be maintained in a local database, optionally storing these images in encrypted form, with the decryption key downloaded from the central database; this would enable a teller to verify the identity of a banking customer, by making the image of that customer available on the transaction terminal screen. In addition, an image may be taken of the subject person(s) and/or their signature(s), fingerprint(s), or "token(s)" at the time of the transaction, and associated with the transaction, in order to memorialize the participants in the event; this image may be uploaded to the central database computer and optionally stored in a separate transaction database.

In a business environment, any type of legal document, such as a contract, may be secured by associating the document with a particular identifying image, much in the same way as Notary Public procedures are employed today. Images of the principals may be deposited in a special image archive facility, for later retrieval in the event of any dispute.

Transactions which do not involve a financial element may make advantageous use of the system as well. In a law-enforcement environment, a police officer that has stopped a suspect vehicle could download an identification picture of the registered owner before approaching the vehicle, thereby giving him the advantage of knowing in advance the physical appearance of the presumed driver. For subjects taken into custody, the identifying image would allow rapid identification of the individual, and would inhibit accidental release of a detainee due to errors in identification. For Immigration Department officials, downloaded images would allow verification of the identity of subjects presenting passport credentials.

The original identification images would be entered from a banking institution or a retail site of the entity issuing the identification card. After the subject image has been captured, using a still video camera, a motion video camera, or a scanned photograph, the image is data-compressed, encrypted, and transmitted to the central image database. Once it has been included in the image database, the image for a particular subject may be associated with as many different identification cards, credit cards, or customer accounts as desired, and made available to any number of transaction computers, which may be representative of a plurality of independent transaction systems. Preferably, a scanned image of the signature of the subject would be included, and associated with the subject image file, along with any other identification data, such as the Social Security Number or a special password.

In an alternative embodiment, the identification image may be stored in encrypted form within the identification card, with the decryption key provided from the central database computer at the time of the transaction.

In a further alternative embodiment, a portion of the image may be stored within the identification card, with the remaining portion provided from the central database computer. Either or both portions may be in encrypted form, with decryption key or keys supplied from either the identification card, or a local computer, or the central database computer, or any combination of these options. One possible embodiment would provide the decryption key for the local portion from the central database computer, and the decryption key for the portion provided by the central database computer from the local source identification card.

In yet another alternative embodiment, the image may be stored on the central database computer in encrypted form, while the identification card provides the decryption key.

BRIEF DESCRIPTION OF THE DRAWINGS

FIG. 6 shows a further alternative layout of a screen display for an item listing, suitable for data entry or for database scan results, in this case customized for real estate; and FIG. 7 shows yet another alternative layout of a screen display for an item listing, suitable for data entry or for the display of database scan results, in this case customized for use with records describing individuals.

DETAILED DESCRIPTION OF THE PREFERRED EMBODIMENTS

Figure 1:
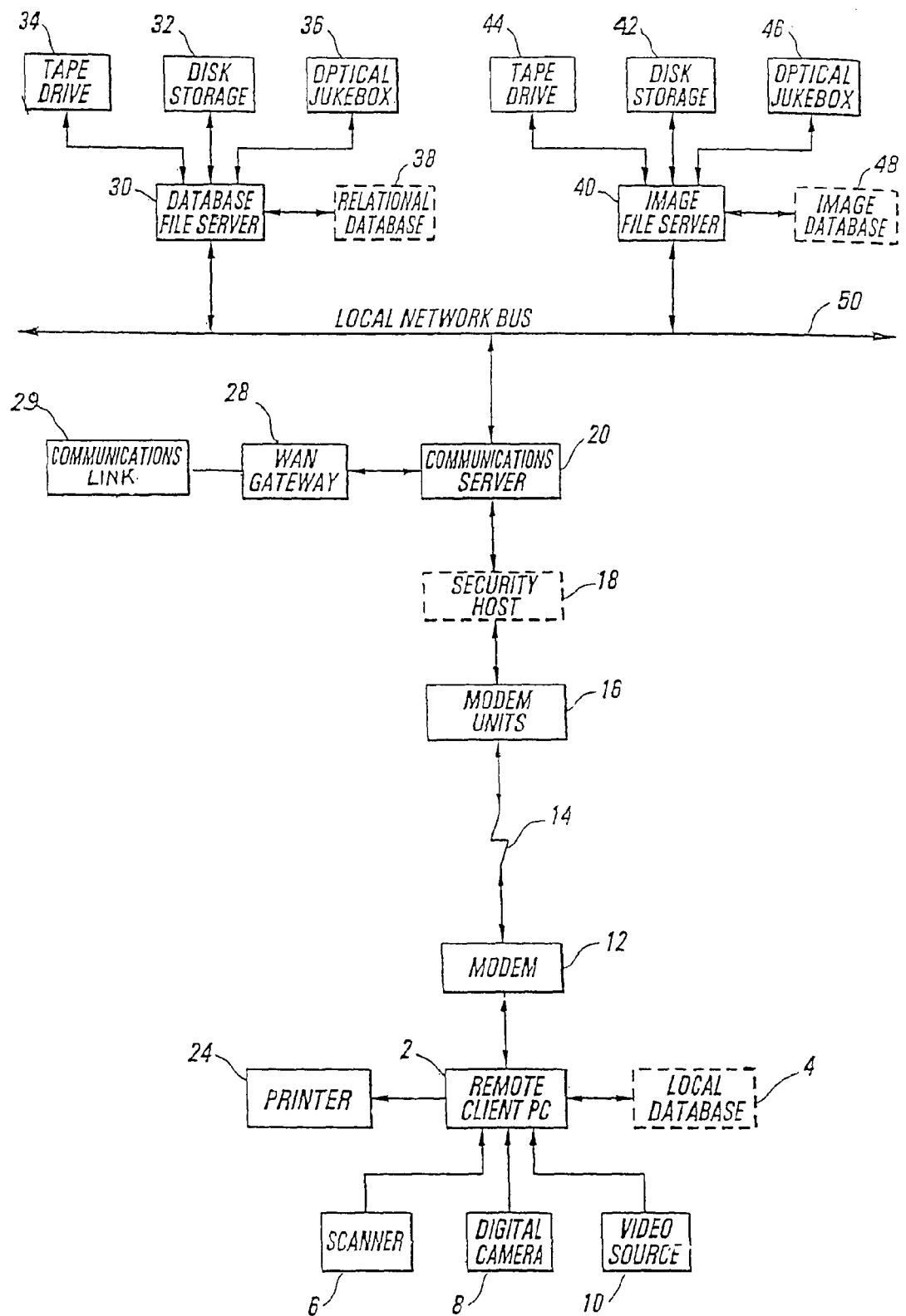
FIG. 1 is a block diagram depicting the hardware components for uploading image identification information in the preferred embodiment.

The present invention takes advantage of computer networking, computer-based communication, client-server architecture, and relational databases in order to implement a new and unique system for secure identification and communication. Background information is available through the Bijnagte (U.S. Pat. No. 5,235,680) and Sibley, Jr. (U.S. Pat. No. 4,677,552) references, and also through descriptions of computer network operating systems (such as Novell NetWare, UNIX, or Microsoft Windows NT-Server), for communications protocols (such as TCP/IP or IPX), or for communications links (X.25, ATM, ISDN, or T1/T3 lines).

For the purpose of this disclosure, it should be understood that the term "item" is intended to refer to any product (new or used), any service, or any person to be listed within the database of this invention, and for which or whom image information is available for display based on a specific request. Broadly, the system may be used in conjunction with marketing activities, such as advertising the availability for sale of automobiles, trucks, heavy equipment, vehicle parts, or real estate, or even regarding characteristics of individuals (though not limited thereto), wherein text and image information files are stored in and retrieved from a relational database and an image database, respectively, and wherein a client computer site may convey bidding or other information related to such products to a central server computer.

In creating a database for such items, it is first necessary to determine the various characteristics by which the individual items will be searched or sorted. For products, this could include characteristics such as color, size, or style; for real estate, this could include location of the property or price range; and for people, the traits might include professional or career activities, medical or legal specialties, age or even physical attributes. When these factors have been identified, a relational database may be created, by which the various items or people may be sorted in accordance with one or more of the predetermined characteristics.

Additionally, users (e.g., buyers, subscribers and the like) who are not physically present at a transaction terminal that is remote to the central server computer can be identified by a salesperson or agent of the seller and a transaction authorized by comparison of an image selected by the user (e.g., a "token" having personal significance known only to the user) with a pre-existing image of the token previously entered into the central database. The "token" image need not have any visible connection to the user being identified for a transaction; for example, the image could be a picture of the family pet, a corporate logo, textural information, or some kind of geometric pattern.

Another aspect of the secure identification system is the association of multiple images (as, for example, in the case of a husband and a wife, or parents and information files are stored in and retrieved from a relational database and an image database, respectively, and wherein a client computer site may convey bidding or other information related to such products to a central server computer.

In creating a database for such items, it is first necessary to determine the various characteristics by which the individual items will be searched or sorted. For products, this could include characteristics such as color, size, or style; for real estate, this could include location of the property or price range; and for people, the traits might include professional or career activities, medical or legal specialties, age or even physical attributes. When these factors have been identified, a relational database may be created, by which the various items or people may be sorted in accordance with one or more of the predetermined characteristics.

Additionally, users (e.g., buyers, subscribers and the like) who are not physically present at a transaction terminal that is remote to the central server computer can be identified by a salesperson or agent of the seller and a transaction authorized by comparison of an image selected by the user (e.g., a "token" having personal significance known only to the user) with a pre-existing image of the token previously entered into the central database. The "token" image need not have any visible connection to the user being identified for a transaction; for example, the image could be a picture of the family pet, a corporate logo, textural information, or some kind of geometric pattern.

Another aspect of the secure identification system is the association of multiple images (as, for example, in the case of a husband and a wife, or parents and children) with a single record, or of multiple accounts, ID cards, or PIN numbers with an individual image or multiple images. In practice, an association may be established between any number of images having some defined relationship with each other and any number of data records having some defined relationship with the images.

Turning now to the drawings, FIG. 1 shows the organizational structure of a typical remotely located client computer forming part of a client/server system architecture in accordance with the invention. At the option of the system designers, a personal computer 2 maintains, on its disk storage facilities, a local database 4 of items or people to be listed within the system. As these items, products, or people are identified, the characteristics of each are entered into the local database, employing conventional user interfaces such as the keyboard and "mouse" (not shown) provided with the personal computer.

Image files related to these items are then associated with the items in the database record, using the photographic image scanner 6 or the digital still-video camera 8. Other possible sources could include analog, still or motion video sources 10, which would provide signals to be digitized by a digitizer-plug-in-board installed within the PC (not shown), or digitized video signal materials provided from other sources. After the images have been input to the PC, they preferably are data-compressed for storage on the internal hard-disk provisions included with the PC, at the option of the system designers; this process is discussed in further detail below.

For convenience, a printer 24 is provided to prepare hard copies of the subject images, including associated images such as the scanned signature of the subject, with or without additional text information. In addition, the printer may be used to provide a hard-copy record of any transaction performed at the terminal.

In many cases, the image of a particular item or individual may be deemed to be useful for local identification, and the manager or "controller" of the item may choose to keep the item within his local database rather than to list it on the central database, thereby providing information for local use or to decrease the duration of transactions by eliminating the need to download the image of a subject. In this case, no further steps will be required, as there is no communication with the central database computer. However, if the item is to be listed on the central database, the following steps are executed.

The client PC 2 is equipped with a modem 12 for data communication to the central database computer over telephone lines 14. Typically, this modem will be capable of operation at least at 14.4 KBaud; however, 56 KBaud or faster modems, connections utilizing the Internet, dedicated communication links, ISDN (Integrated Services Digital Network), or DSL (Digital Subscriber Line) communication links may be implemented, with progressively higher performance. This communication link 14 is connected via one of a plurality of available modems 16, or by appropriate communication link, to a network-remote-node communications server 20. Hardware to effect this type of communications-link at the communications server site is readily available from manufacturers such as Digi International or USRobotics.

As an alternative to modem 16, connection to this communications server may be achieved via a wide-area-network (WAN) access provider, such as an Internet access provider, through appropriate network gateway hardware 28. In such a case, the gateway communications link 29 may be implemented via ISDN or DSL lines, dedicated communications lines, T1/T3 service, or satellite links. In alternative implementations, the network gateway hardware and communication link may be implemented at a different point in the server site, such as in a device directly connected to the local network bus 50 (described herein below) or as interfaced directly to the database file server 30 (described herein below). Where a network of server sites is implemented, this communication link, or a separate similar link (not shown), would enable the various server sites to communicate with each other, or with other computer facilities outside of the network. In practice, a plurality of communications servers may be required at each site, depending on the capabilities of the communications server hardware 20, the number of simultaneous active clients to be served, and the type of communication links established by the clients.

Upon log-on by the client PC, the communications server 20 preferably first authenticates the user by way of known security measures included in typical multiple-access computer systems, and optionally may also verify the Caller ID signal transmitted by the telephone system, as currently available in most communities throughout the United States. Alternatively, the communications link path may include a "security host" computer 18, such as the model ACM 400 offered by Security Dynamics, interposed between the modem 16 and the communications server 20. This computer checks for the presence of a particular hardware security key installed at the client PC, as further described below in reference to FIG. 3. Upon authentication, any updates in software optionally may be downloaded automatically to the client PC. In some cases, it may be necessary to check the client PC to confirm the presence of certain hardware, or to verify that a correct version of software is currently in use. This may be determined by way of specialized systems management software available for many network operating systems, or by programming the client PC to automatically provide this information to the communications server as part of the log-on procedure.

The communications server 20 is connected to a local network bus 50, which may be implemented using any of the many well known networking architectures, including Ethernet, Fast-Ethernet, or Token-Ring. Also connected to this network bus is the database file server 30, which maintains the database records and manages the image storage processes. The database file server is equipped with a Random Array of Inexpensive Disks (RAID)-based mass-storage system 32, which holds all the data records in the central relational database 38.

In addition, this server system includes a tape-drive back-up unit 34, and optionally may include provisions for an optical-disc "jukebox" unit 36 to extend data storage capabilities. Networks of this type are compatible with various operating systems, including UNIX, Novell NetWare, or Microsoft Windows NT-Server, although the system selected should support access for multiple remote clients.

Images associated with the relational database 38 are stored on an image file server 40, also connected to the network bus 50. This file server is equipped with a RAID-based mass-storage system 42, which holds all the image records in the image database 48. In addition, the image file server 40 is equipped with a tape-drive back-up unit 44, which optionally may include provisions for its own optical-disc "jukebox" unit 46 to extend image storage capabilities.

For data entry, the descriptive records for the specific items are stored in the relational database file server 30, while the associated images are uploaded for storage on the image file server 40. In operation, the storage locations of the associated image files managed by the image file server are referenced by the database file server, and provided as requested by the client through the communications server 20. The actual images may be stored as "pages" within an image compilation file, and may include one or more "thumbnail" or reduced-size images, which may or may not be illustrative of particular full-size images, and which may be transmitted quickly to give an over-view of the item.

Alternatively, the images could be organized with a primary image file (with or without an associated reduced-size image) and one or more secondary image files containing multiple image pages, with or without reduced-size images. In the latter situation, the user typically would first request the download of the primary image file for an item, and then, if desired, would have the option of also downloading one or more of the secondary image files, in order to obtain further information about that particular item. In the case, for example, of multiple images associated with a single identification record (such as images of a spouse, or of children), the identification card optionally may contain data which directs the image server to retrieve a specific image or images from the set. In this way, a single credit card account for which separate cards have been issued to a spouse and two of the children would, in the authentication process, result in the retrieval of the image that relates to the specific card. Therefore, the "spouse" card would be associated with the "spouse" image, while the "Child #2" card would be associated with the "Child #2" image. As an alternative, a single image, for example, showing all of the children, could serve as the identification image associated with the individual cards for each of the children.

All data files and images files may be held in the active (RAM) memory, or off-loaded to the local hard-drive of the client PC, so that they may be reviewed and compared by the operator as desired, without further communication activities. In client PCs having multi-tasking capabilities, the downloading process may continue as a background task, while the operator examines the material that has already been received and, as necessary, decrypted, as a foreground task. In this way, the operator need not wait until all of the data has been downloaded before beginning the examination of the materials transmitted.

In a typical operation, the client will provide (i.e., upload) information relating to specific items, which are identified and then stored by the database file server 30. Based on the items stored by the database file server 30, the client then may request that selected images be uploaded to the image file server 40. The client may then request-selected images to be downloaded from the image file server or descriptive information to be downloaded from the relational database or both. If the list has a small number of items, the user may choose to view all of them in some sequential manner; but if the number of items is large, the user may instead be prompted to select the item records to be retrieved, or to refine the search criteria further so as to be more selective. This technique allows each of the system components—communications server, relational database file server, and image file server—to be optimized for its specific application.

However, depending on the particular application, database size, and communications traffic, one or more of these functions may be combined, such that in some cases a single server system may provide all of the required functions; this could include both the database file server function and also the image file server system, such that both kinds of data optionally may be stored in the same database, or even within the same record. In other cases, multiple servers may be required for one or more of these functions, each of them connected to the local network bus 50.

In one aspect, the descriptive records for the specific items, which are stored in the relational database file server 30 may be independently retrieved while the associated images remain in the image file server 40. Likewise, images which are stored in the image file server 40 may be independently retrieved while the associated descriptive records remain in the relational database file server 30. This is distinct from the prior parent Application, wherein only both textual and image, or text alone, could be retrieved.

It is anticipated that in some cases the client PC will not have the required windowing capabilities, and will only process textual information. In these cases there will be no uploading or downloading of images to that client, and all database services will be confined to the relational database file server; however, textural information (such as a description of a "token") may be included, for upload and download to text-based client PCs. In some applications, it may be necessary to control the access to the databases, so that clients may upload items for inclusion into the database, but downloading to clients is prohibited or restricted to specific clients (such as government authorities or police units) for reasons of security or privacy, as discussed herein below.

Figure 2:
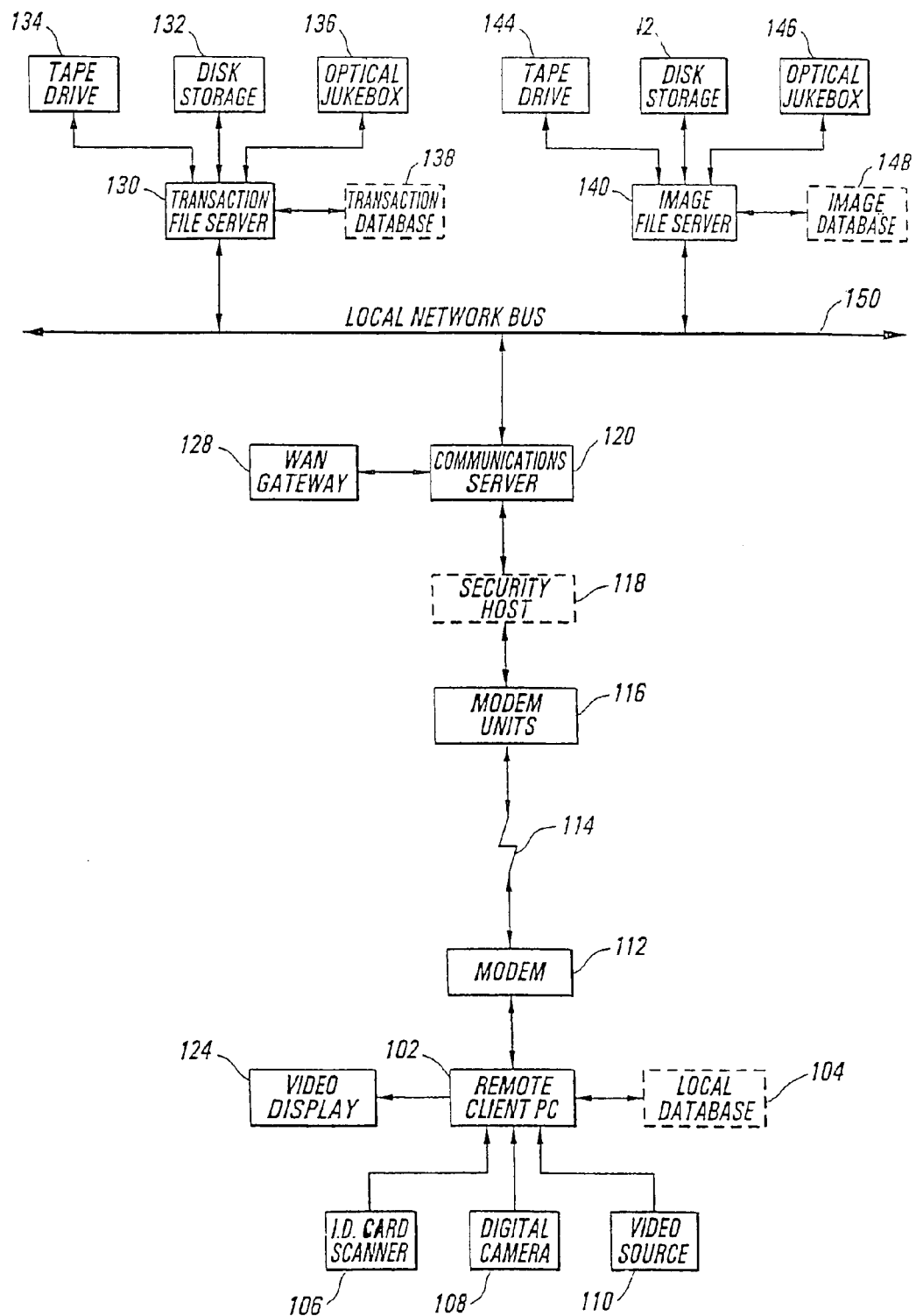
FIG. 2 is a block diagram depicting the hardware components for downloading image identification information in the preferred embodiment.

The steps involved in an identification event or transaction will be understood with reference to FIG. 2. In many respects, the system architecture is equivalent to that of FIG. 1, except that the flow of image file information generally is in the opposite direction. It will be appreciated that many of the details of the data communications and system architecture will function in identical ways, and therefore the reader is referred to those discussions herein above. In a typical identification event, a subject will present an identification card (I.D. card) for verification at the event site. The actual scanning device 106 may be implemented as a magnetic stripe reader, optical reader, or pattern recognition unit. This scanning device will retrieve identification information from this I.D. card, which is representative of the subject, and communicate it to the transaction terminal 102. In practice, this unit may be as simple as a credit card reader, or as complex as a PC, which is part of a sophisticated computer network. For the purpose of this discussion, the function of the transaction terminal will be explained with the understanding that it is a remote client PC connected to the central database server.

The remote client PC 102 may be utilized as part of a product UPC-code scanner or optical character reader system that interprets product tags. As an option, a local database 104 may be maintained on this PC, such that when a particular product tag is scanned, an image of the correct product item is presented on the video display 124. In an alternative implementation, this database would maintain identification images of the subjects, such as images of regular customers at a bank or retail store. When any input of product information has been completed, the primary identification event or transaction may be effected. In a banking environment, this could be part of a financial transaction, such as an account deposit or withdrawal; in a retail operation, this would correspond to a credit card transaction or a payment for goods by check. When the I.D. card is scanned, the information is communicated through the modem 112 to the telephone line or communications link 114 and on to one of a plurality of modem units 116. As explained herein above, the system optionally may include a security host computer 118 interposed between the modem 116 and the communications server 120.

The communications server 120 is connected to a local area network 150, typically implemented using one of several forms of Ethernet. Also connected to this network bus is a transaction file server 130, which maintains a transaction database 138 containing information used to identify any verification passwords and the storage locations of the associated image files. This transaction file server is equipped with a RAID-based disk storage unit 132 and a tape drive 134 for data back-up. As an option, this server also may be equipped with an optical-disc "jukebox" 136 for additional storage capacity.

Images associated with the relational database 138 are stored on an image file server 140, also connected to the network bus 150. This file server is equipped with a RAID-based mass-storage system 142, which holds all the image records in the image database 148. In addition, the image server is equipped with a tape-drive back-up unit 144, which optionally may include provisions for its own optical-disc jukebox unit 146 to extend image storage capabilities.

In response to an identification event or transaction, the client PC will download information related to the subject, which previously has been stored on the database file server. In addition, the client then may download selected images from the image file server, including both identification images and also associated images, such as images of the signature of the subject. In an alternative embodiment, access to individual images may be restricted to specific clients; for example, one client may only be permitted to retrieve one or more identification images, but not be authorized to retrieve some of the associated images, while another client may be authorized to retrieve all images.

This technique allows a single server system to provide all of the required functions. In other cases, multiple servers may be required for one or more of these functions, each of them connected to the local network bus 150. In addition, depending on the overall architecture of the system, the various communication servers 20 and 120, and file servers 30, 40, 130, and 140, may be combined or separated as necessary to match the demands of the communication load, convenience, economy, or the like.

Figure 3:
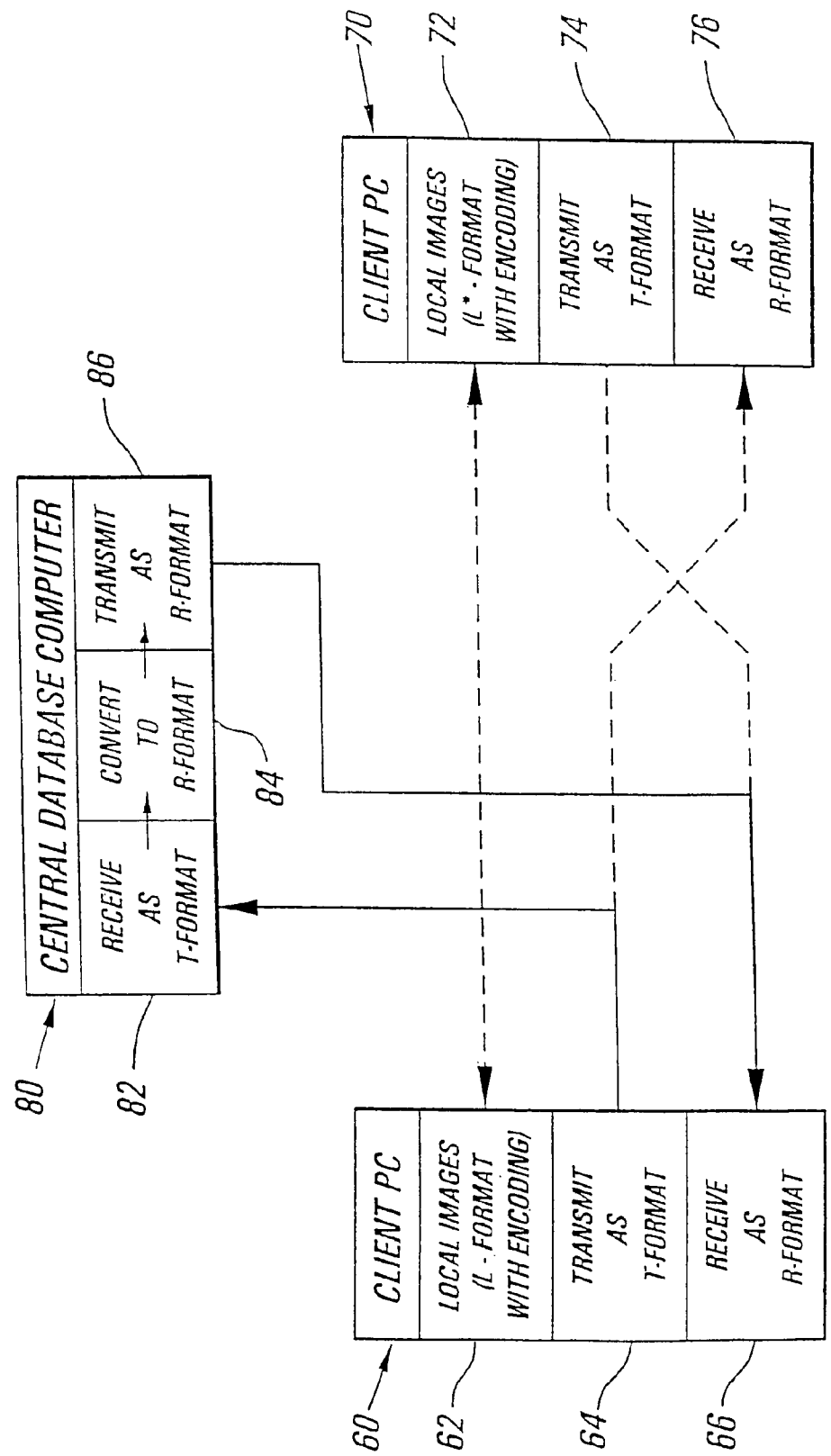
FIG. 3 is a block diagram depicting one possible scheme for managing the various formats of image data compression utilized for local data security and for the control of the transmission of images between remote sites.

FIG. 3 shows the inter-relationship between the various file formats for images stored locally at client PCs, transmitted to or from the server image database, or transmitted between remote client sites. In FIG. 3, solid lines show compatible image file transmissions, and dashed lines show incompatible image file transmissions.

A client PC, shown generally at 60, optionally may maintain a local database 62, which includes image files associated with particular items. These files are encrypted by any of several available techniques, including commonly utilized formats for data encryption or by custom modification or encryption of the file header information so as to link the files themselves with the password character sequence contained inside a hardware security key.

The security key is particular to each user. Such security key, which may be a "dangle" or any other suitable security key as is well known in the art, includes information such as passwords, database connection information, or control of available program features specific to a particular client. The security key may contain some or all of the following information as follows: local PC identification, user name and password for access to the central computer database, information necessary to complete communication to the file servers.

In typical usage, this hardware key consists of a limited number of storage cells in an EEPROM, which have been programmed with a unique sequence of characters. Only a computer having this particular security key attached to the parallel interface connector is able to decrypt the image files and reconstruct the image; this encrypted format is designated as the "L" or "Local" format for the purposes of this discussion. This security also may be used to control the permissions for access to the network server computers, to uniquely identify the client-PC station, or to provide information (possibly including dial-up telephone numbers or TCP/IP network address settings), which may be needed to complete the communications path.

In practice, the actual data compression methods employed could include the industry standard REG format, Lead Technologies "cmp" format, Iterated Systems "fractal compression", "wavelet compression", or other proprietary or commercially available techniques. Compression ratios on the order of 30:1 or more preferably are employed, thereby producing image files of approximately 10 KBytes or smaller in size. It would be particularly advantageous to utilize a compression technique which is resolution-independent. (such as fractal compression) which produces very compact image data files that may be re-sized to match the video display interface hardware in the client PC. In addition, selected image files 64 to be uploaded to the image file server and designated as "T" or "Transmitted" format are created by modifying the internally stored L-format files, utilizing formatting methods similar to those discussed above for encrypting without hardware security keys.

Alternatively, the use of "public" keys with "private" keys may be implemented, as well established in the art of secure encrypting of data transmissions, and following standards such as the DES (Data Encryption Standard) developed for the U.S. Government, or the MD5 system offered by RSA Security, Inc.

Similarly, image files 66 downloaded from the image file server 40 are encrypted in "R" or "Received" format, which may be distinct from either the "T" format or the local "L" format. These files are decrypted upon receipt, and may be converted into the normal L-format utilized for the local client PC database.

A second client PC is shown generally at 70. This second client PC also may maintain a local database, but, because of the security techniques described herein above, the image file storage format is distinct from the format of the first client PC, and is designated as L*. In addition, the second client PC has provisions for uploading, downloading, and converting image files in the R and T formats described in reference to the first client PC or the remote PC may be provided facilities for decrypting the "R" format.

In another aspect, some combination of formats may have the same encryption, which would no longer necessitate some or all of the differing decryptions and conversions as previously described.

If an attempt is made to transmit or transfer a file directly from one client PC site to another (or to a client PC not legitimately a part of the system), the images will be unusable, because the L-format images cannot be decrypted by an L*-format client PC, or any other PC which does not have the proper hardware security key, and the Client PCs may not have provisions for converting T-format images into usable form. In order to allow files to be exchanged and viewed by other client PCs or users, the image file server, shown generally at 80, may perform this conversion step, or alternatively the transmitting PC as part of the upload process may perform this step. Image files uploaded by client PCs in T-format are received at step 82, and may be converted at step 84 to the R-format.

At this time, files optionally could be converted from one image data compression scheme (for example, by LEAD Technologies) to a different image data compression scheme (for example, fractal compression by Iterated Systems) to save local storage space and communication costs and time during image downloading procedures. In many cases, sophisticated hardware-assisted image processing (such as the step of fractal image compression) is expensive to implement on a client-PC-wide basis, but would be economically feasible at a central database site. At step 86, the R-format image files may be transmitted to any other client PC site on the network It should be understood that the image files may be stored in T-format and converted at the time of transmission, or converted to R-format at time of receipt and storage; alternatively, the files may be stored in a third format which may be incompatible with either R- or T-format files. Further, the files may be converted to either the R-format or this third format by the transmitting PC 60 at the time the files are uploaded to the server, rendering it unnecessary for the server to perform this step.

Figure 4:
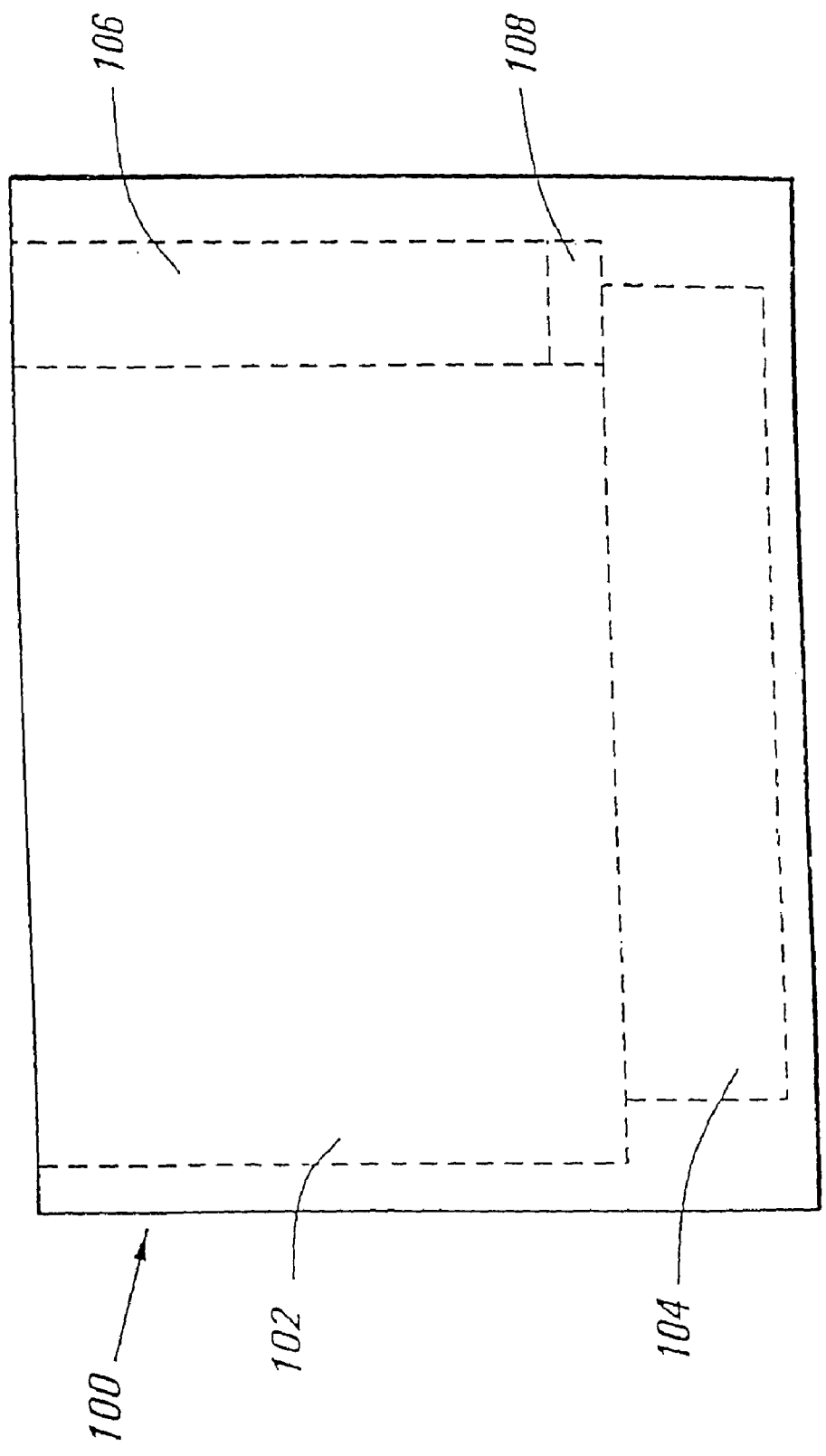
FIG. 4 shows one possible layout of a screen display for an item listing, suitable for conventional television display units or for video recording.

FIG. 4 illustrates one possible format, arranged for use with a video-television display, for the automatic, sequential display of selected item information and associated images retrieved from either the local item or central item databases. The standard VGA-format screen dimensions of 640 pixels (horizontal) and 480 pixels (vertical) are shown generally as 100. Within the screen display 100 is an image display area, indicated as 102. This area may contain one or more images from a variety of sources. If a still video camera by Dycam, Inc. has been utilized to accumulate images, this image area will be completely filled by the camera output image.

A separate area 106 may be utilized to show item identification information, such as manufacturer name, manufacturer logo, regional location, or additional image information. An area 104 is designated for text information to describe the product. Associated text and image information is sequentially displayed, in accordance with the predetermined sequence, in which an image may correspond to any number of text files, or a text file may correspond to any number of images. A separate index counter displaying alphanumeric information at the area 108 enables the viewer to identify individual items within the program. In order to assure that the "safe-action-area" is visible on conventional television receivers, space has been left unused at the sides and bottom of the screen. These sequentially displayed item information screens may be recorded locally, simply by connecting a VGA to NTSC scan converter (not shown), such as the Hyper-Converter unit manufactured by PC-Video Conversion Corporation, to the PC-display monitor output, and the resultant scan converted NTSC or PAL format video signal from the scan converter to the video input of a VCR (not shown).

Figure 5:
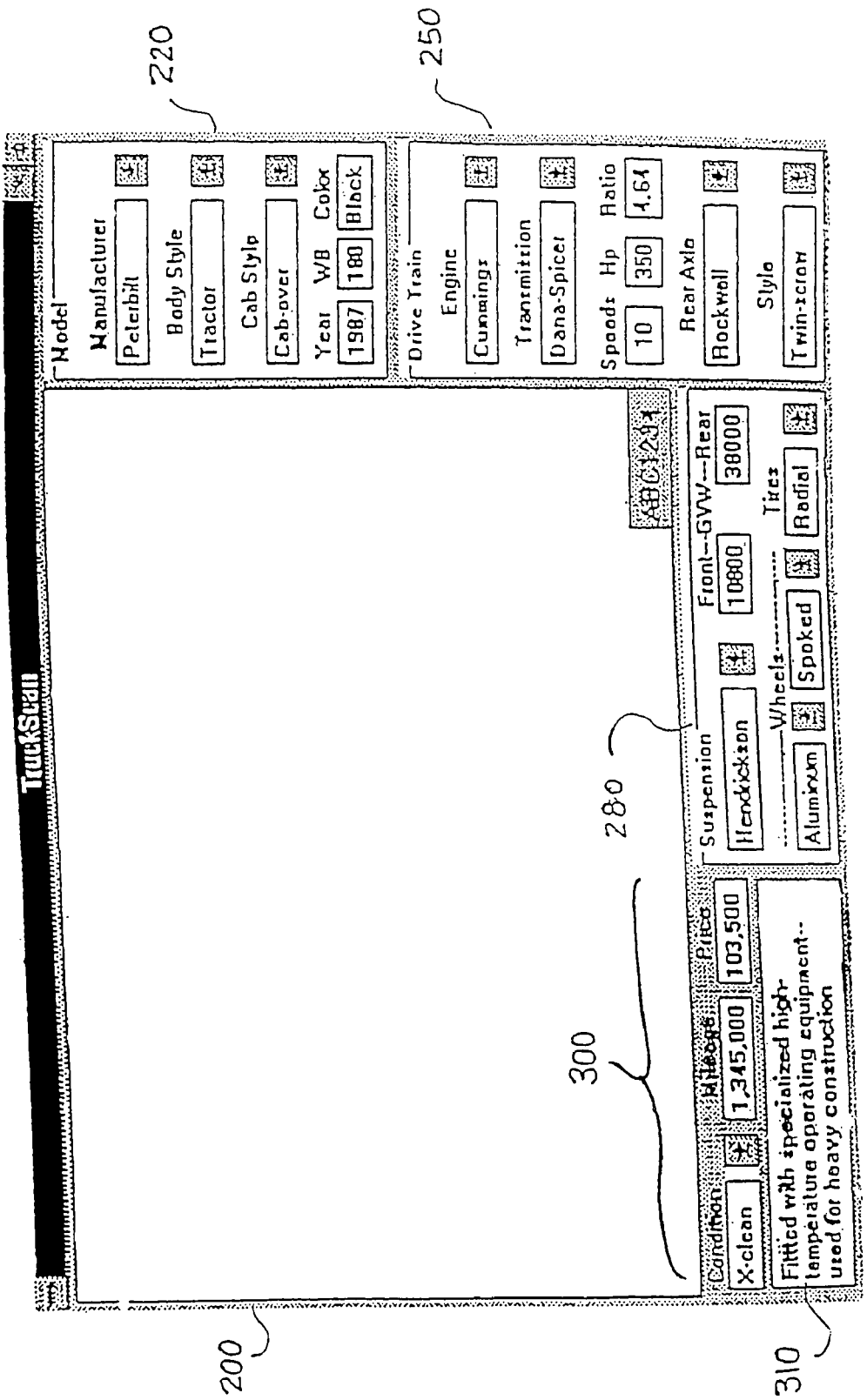
FIG. 5 shows an alternative layout of a screen display for an item listing, suitable for data entry or for the display of database scan results, in this case customized for truck advertising.

The data entry process may be explained more fully by reference to FIG. 5, which shows, by way of example, a screen configured to facilitate the input of information describing a used truck. This particular display screen may be prepared using one of the many available software development programs, such as "Visual Basic" by Microsoft Corporation. Such development programs allow for the creation of a graphical user interface (GUI) "front-end" for access to a relational database, and include provisions for a variety of specialized "controls", such as "text boxes" and "drop-down list boxes", which are integrated into the graphical user interface (using a "mouse") as shown.

The area 200 is designated for displaying an image of the subject item, which is assumed to be available in one of several possible formats. If the image has been captured on a digital still-video camera from a manufacturer such as Dycam, Inc., Kodak, Sony, or some other manufacturer, then it may be imported from the camera into the PC by way of the serial data interface, using custom software. This software will import the image, and then create a data-compressed version utilizing the data-compression software selected, such as offered by LEAD Technologies or Iterated Systems. This data-compressed image will be stored in the local database, when data entry is completed and the record information as shown is accepted by the operator, using the local encryption method selected, which may include modification of the file header to include a password, or utilize other well-known methods of file encrypting.

The remaining information shown on the screen may be inputted to the local relational database, and stored with references to any item images. In the particular case shown, the area designated as 220 (titled "Model") has "drop-down list boxes" which list possible selections for each of the illustrated categories, including "Manufacturer", "Body Style", and "Cab Style". Simple "text boxes" are used to type in data for the categories "Year", "WB (Wheelbase)", and "Color". The area designated as 250 (titled "Drive Train") has drop-down list boxes for the "Engine" manufacturer, and the rear axle "Style", along with text entry boxes for the categories transmission "Speeds", engine "Hp (horsepower)" and rear axle "Ratio". The area designated as 280 (titled "Suspension") provides drop-down list boxes for the suspension type, the manufacturer and type of "Wheels", and the "Tires", with text. entry boxes for the categories "Front GVW (Gross Vehicle Weight capacity)". The area generally designated as 300 has a drop-down list box for the "Condition" of the vehicle and text entry boxes for the vehicle "mileage" and "Price". The area designated as 310 is a text entry box in which the operator may include any additional comments.

After completing the data entry of the information, the operator then selects the necessary options for storage of the record in the local database. At this point, any necessary encryption steps are completed, an item identification number is assigned by the computer and displayed in the item identification number text box, and, if desired, the operator may choose to transmit the record to the central database computer, as a single transaction or with additional records included in a batch transaction. When stored on the central database computer, an item identification number is assigned for this centralized record, which may be different from the local item identification number. Another screen, similar in layout to that of FIG. 5, may be utilized to display records retrieved from the local database or from the central database.

The process of record retrieval from either the local database or the central database must be managed in different ways based on the results of any search. In order to perform this kind of search, the operator uses the mouse to effect the display of the selected screen, and then utilizes a procedure similar to the one described above with reference to the input of a new record. In this case, however, all of the selections need not be identified nor available. For example, the vehicle manufacturer, engine, and transmission might be specified, but the color left unrestricted, or the characteristics of the wheels and tires left unconstrained. The reader will appreciate that the greater the degree off specificity provided by the operator, the fewer the number of matches that will be found. Once the search criteria are identified, the communication link to the central database computer may be used, and the appropriate commands may be transmitted to the central database computer in the chosen SQL (Structured Query Language). The central database computer identifies the records satisfying the search criteria, and notifies the client PC location of the results of the search. For a search limited to the local database, the same steps are performed, except that no remote communications are required.

In one aspect, the display of the selection screen used in entering information, or a first display screen of the requesting remote data terminal, is the same as the display of the selection screen used in displaying the de-compressed images along with textual information at the requesting remote data terminal.

The next steps in the process will depend on the results of the search. If only a few matches are found, the operator may be offered the option to have these records retrieved immediately. If, on the other hand, a larger number of matches is found, the operator will be presented with a list summarizing these records, from which the operator may select those records which are to be retrieved. Finally, if a very large number of matches is found, the operator will be prompted to provide modifications or additional restrictions to the search criteria, so as to further limit the number of matching records, or, alternatively, the operator may elect to retrieve all of the search records, or to receive a hard copy of the list by way of a locally connected printer 24. If the operator is interested in a particular item, instructions will be provided for contacting the owners of products or the individuals listed.

From this explanation it should be clear how this technique may be applied to a variety of products, in accordance with this invention.

As a further examples, FIG. 6 shows a display screen layout suitable for a database of homes or other real estate, and FIG. 7 shows a display screen layout suitable for a database of individual people, such as would be utilized for registering children (e.g., to thwart abduction), for professional directories, or for personal introductions. In the case of registration of children, access to the records would be restricted, so that the client PCs could add records to the central database computer, but could not retain records in their local database, nor search the records held in the central database computer. Those records in the central database computer would be available only to appropriate governmental authorities, as directly controlled by the central database System Administrator.

A further alternative is available for specialized applications, such as the tracking of missing children. Many pay-telephones, particularly those located at airports and other travel related facilities, have video display capabilities, in anticipation of future "video-phone" applications. When not is use, these telephones typically are set to show advertising screen displays encouraging customers to use the telephone service. With data files and image files related to missing children being downloaded to these telephones when not in use, the images could be stored in local memory provisions and sequenced in the same manner as that utilized for the existing advertising screen displays. To facilitate this application, the telephones would be configured with additional RAM memory, EEPROMs, or local hard disk drives. In addition, data-compression software for the images would be added, as well as optional facilities for converting the associated text information into voice information, to be made available through the telephone handset. For these text information files, the data could be transmitted and stored as codes intended to facilitate local voice synthesis by electronic means, thereby minimizing the amount of data to be transmitted. Similar applications could be implemented at automated teller machine (ATM) terminals, with the further addition of graphics processing hardware and the optional addition of color screen display capability. The downloading of any necessary information may be scheduled to occur automatically during periods when the telephone device or ATM terminal is not in use.

By utilizing a system architecture in which records in a local database are selectively uploaded to one or more central databases, several additional features may be realized. First, it allows the user/manager of the local database to exercise an unusual level of control over the content of the information in one or more central databases, the decision whether or not to update each of the central databases, and the timing of the updating of the records to these central databases. In addition, it provides the user with the option to transfer ownership of the record in his local database to another user, for use in the second user's local database. The second user then has the option of uploading the record to one or more of the central databases, with any modifications he chooses to include, so that the new ownership is reflected in these central database listings as well.

This "transfer" facility is particularly useful in the case of a user who is a dealer, and who has several retail outlets for sales of his products. Here, in addition to the local database and a main central database, there can be one or more "private" databases, which may be located at the site of the main central database, or may be located at a different site which may be remote from the main central database; as an alternative, these private databases may be physically located at sites of individual users of these private databases. For each private database, records within the private database may be viewed only by those specific members of the group (such as other outlets operated by the same dealer) or other users (such as regular buying or selling partners) that have been granted permission to access this private database. In practice, a user may be a member of any number of private databases, and a private database may have any number of members.

As an example, assume that User A has physical possession of the product in question, and has created a record in his local database. This record then is uploaded to a private database maintained for a group of which he is a member; if the user chooses to do so, the record may be uploaded to one or more of the central databases. If the product is relocated to a different user (for example, User B), then the custom software installed for User A can be used to effect the transfer: the software removes or edits the existing record in any central databases, removes or edits the record in any private databases, and removes the record from the local database. In practice, the data for the record may be placed in a separate holding area within the main central database, until such time as the receiving user, User B, may download the data for the purpose of creating a new record in his local database. This temporary record is identified in such a way that only the designated recipient of the transferred record may obtain access; this may be done simply by adding an additional data field to the transferred record in the main central database, and using this field to designate the intended recipient. When a user (such as User B) logs on to the system, he can make an inquiry to determine whether there are any records to retrieve, and if so, trigger an automatic process to obtain the data for these records. User B can then use this retrieved data to create new records in the user's local database. At the same time, any related images or data files (such as an Appraisal sheet for the specific item) may be retrieved, so that they may be associated with the new record in the Local Database. After the record has been created in the Local Database, the user has the option to add the record to one or more of the central databases and/or any of his private databases. In this case, any associated images or data files may be uploaded, as well.

In practice, multiple central databases may be established on the basis of their intended usage; for example, central databases may be designated to hold data for groups of dealers or affiliated sales outlets, for items intended for inclusion in a specific publication, items intended to be listed on an Internet advertising site, for a central listing or for a dealer-specific web site, for items intended to be offered at an auction, or for other purposes.

In the case f items intended to be listed on an Internet site, the listings may be managed remotely by the dealer that controls the local database containing that item. Specifications, pricing, images, and other data related the item may be edited in the local database. Next, these changes are uploaded to the central database designated for Internet listings, and then these changes automatically will be reflected in the Internet listing as well.

The facilities described may also be utilized so as to implement an interactive, on-line auction for the products displayed, in accordance with the invention. In this case, one or more remote sites would display product descriptions and images, including live video images of various products offered for sale. At the remote sites, still-video images or live camera signals captured by a video digitizer printed circuit board installed in the remote PC, as described above, are transmitted to the central database computer. The central database computer, in turn, relays the descriptions and images to all other remote sites, which have established communications links so that they may participate in the auction.

The architecture of the system includes provisions for managing local and remote database records and associated image and data files for items offered on an auction basis. In addition, users who may or may not be subscribers to the system may search through listings of products to select items on which they may choose to bid. Access to the system may be provided by way of an Internet web site, or the user may be provided with special software which allows only viewing, only posting, or both types of access to the listings. If a subscriber has upload permission, then as the owner of an item offered, he may selectively upload products available for the auction, which, in turn, are bid upon by other participants. The participants' bids are recorded in a database table, with identification information which will enable the owner of each product offered to contact the high-bidder. If for any reason the high-bidder is unable to complete the transaction, then the product owner has the option of offering the product to the next higher bidder. The software for both the bidder and the product owner allows the viewing of the current high-bid information, and the bidders are given visual and/or audible signals to indicate whether their own bid represents the current high-bid. This notification may be obtained simply by periodically querying the database bid records to determine the current high bid and then comparing it to the local records of bids submitted for various products or items to determine whether the current bid value matches the last bid value submitted from the local user. Alternatively, the local user may make this determination by obtaining the current high bid and comparing it to the bidder identification that is associated with the entity that placed the current high bid. A further alternative would be for the central database computer or other computer associated with the central database computer to "broadcast" the latest bid information over the network connection, so that each bidder would have updated information available to them. Once the high bid comparison has been executed, the local bidder may be notified of the status of his bids using audible alerts to any change in status, or by visual indication, such as color changes on the display, flashing text, flashing rows in a grid, or flashing "window" borders, etc.

As a further option, according to this invention, items that have been identified from the central database computer may be offered for sale. When a participating remote client PC desires to enter a bid, this bid is relayed via the communications link 29 to the central computer, at which point the bid is made available to all of the other participating remote client PC sites. When the bidding period has expired, the remote PC sites will be notified and the seller and the winning bidder-buyer will receive confirmation notices.

It should be noted that within the context of this disclosure, the term "owner", when referring to a product or item, should be construed to mean the person, subscriber, or user who controls the product or item that is to be listed or offered for sale, and may not be the entity that actually has legal ownership of the product or item. Authorized agents, representatives, or interested third-parties may act as the "owner" in this situation, but only in the sense that they "own" or control the database records that are representative of the items or products themselves. Similarly, the term "bidder" should be construed to mean a user who has permission to access the database and system, and is authorize to place bids on products or items listed for sale.

In order to facilitate the process of locating specific items desired by a user, various screen-based aids may be employed. For example, custom software may be utilized which guides the user through the selection process by providing a series of choices designed to progressively limit the number of items selected from the desired category. The choices would be based on identifiable criteria for the items in question, and would be applied to a search of the item database.

As an example, consider a user who wishes to find a used truck having specific characteristics and available in a particular geographical location. The search process would be initiated when the user "clicks" on a link on a web page. At this point, the user would be presented with an array of options, such as geographical regions. After several successive selection steps, the location may be identified down to the state or even city level. Next, the user would be presented with a series of choices designed to identify the type of truck (tanker, flat-bed, etc.), the manufacturer, the engine and transmission, the age of the truck, and the price range desired. At this point, a search of the database would be initiated, and the results displayed on the screen.

The identification card would then, in addition to containing at least one characteristic which is associated with the item. have a portion of each of one or more images associated with that item stored thereupon, with the remainder of the image(s) stored in a central database. In other respects, the process would follow the steps previously disclosed herein above, except for the reliance on the image material from the two sources being integrated to form complete image(s), which then would be used, in conjunction with the descriptive text, to determine whether or not to allow the transaction to be completed.

Based on the search, the user is presented with summary information for each item found, including textual and/or image information. If an item is selected, the user then is presented with additional information on that item, including information on how to contact the owner of the item. In an auction environment, the user may be invited to enter a bid on the item selected, in accordance with the system described previously herein. In addition, other similar or related items may be included in the display.

In practice, the system would be implemented as some form of a "decision tree" structure, wherein the selection process proceeds based on either a pre-determined series of selections, on a series of selections which may be adapted based on the user selections (perhaps moving into an entirely different "tree"), or on a combination of these or other similar techniques.

In an alternative embodiment, a link can be used to lead a user to a customized web page. For example, a user may be presented with a link labeled "ABC Truck Sales, Inc." When the user selects this link, a search of the database is performed to find those products offered for sale by "ABC Truck Sales, Inc." Based on the results of the search, a custom web page is constructed and displayed, thereby giving the impression that the dealer has a web site, when actually the web page for this dealer, or other dealers, is created from customizing information specific to the dealer and from the results of the current database search. In this way, the actual web site is maintained by the provider of the database service, and the user is presented with a combination of standardized web pages and pages customized for the dealer the user selected.

In an alternative embodiment, the security issue may be handled in a different manner, either by including a decryption key within the identification credentials (such as a credit card magnetic stripe) to enable the local data terminal to decode a downloaded picture which has been encoded to match that particular decryption key, or by including the encrypted picture in the identification card itself, in which case only the particular decryption key need be downloaded to the local data terminal.

In another alternative embodiment, a portion of the image may be stored within the identification card, with the remaining portion provided from the central database computer. Either or both portions may be in encrypted form, with decryption key or keys supplied from either the identification card or the central database computer. One possible embodiment would provide the decryption key for the local portion from the central database computer, and the decryption key for the portion provided by the central database computer from the local source identification card.

Many possible applications in identification of people readily will be appreciated, including secure identification for credit card, check-writing, ATM, or other financial and retail transactions; identification for law-enforcement or Immigration-control agencies; identification of patients in a medical environment; and any activity for which positive identification is essential, including those activities for which Notary Public services currently are employed. For retail applications, product images retrieved from a local or global database may be used by sales clerks to verify the pricing or attributes of a particular item, by making this information available at checkout-cashiers' stations, or at customer service stations throughout the store. In addition, many of the human identification services to be performed may be automated, using computer-based image recognition techniques, such as the Photobook system offered by Facia Reco Associates, or the TrueFace system offered by Miros. Based on the stringency of the testing criteria, recognition rates for these systems in different applications varying from 95% to 99.9% have been achieved. A further feature of the system is the ability to associate a single identification image with a plurality of accounts, transactions, or records, thereby reducing the data storage requirements for images.

In addition, multiple images may be associated with a single record or account, thereby providing additional identification images for the subject item, or images of additional subject items to be associated with the same record, set of accounts, transactions, or subset of accounts.

What is claimed is:

1. A computer implemented method for allowing a transaction to occur, the steps of the method, as a whole, being executed by one or more computers, comprising:
creating an image of an item;
storing a first portion of said image upon an identification card;
storing remaining portion of said image within a central database;
creating descriptive text;
storing said descriptive text within said central database;

retrieving said remaining portion of said image and said descriptive text from said central database and displaying re-combined said first portion and the remaining portion of said image on a display device; and allowing said transaction to occur only after reviewing said re-combined image portions of said image, and said descriptive text.

2. The computer implemented method of claim 1 wherein the item comprises an item to be purchased.

3. The computer implemented method of claim 1 wherein the item comprises an individual.

4. The method of claim 1, wherein the first portion of the said image is stored in encrypted form.

5. The method of claim 1, wherein the remaining portion of the said image is stored in encrypted form.

6. The method of claim 1, wherein both the first portion and the remaining portion of the image are required in order to construct the correct re-combined image.

* * * * *